Figure 1:
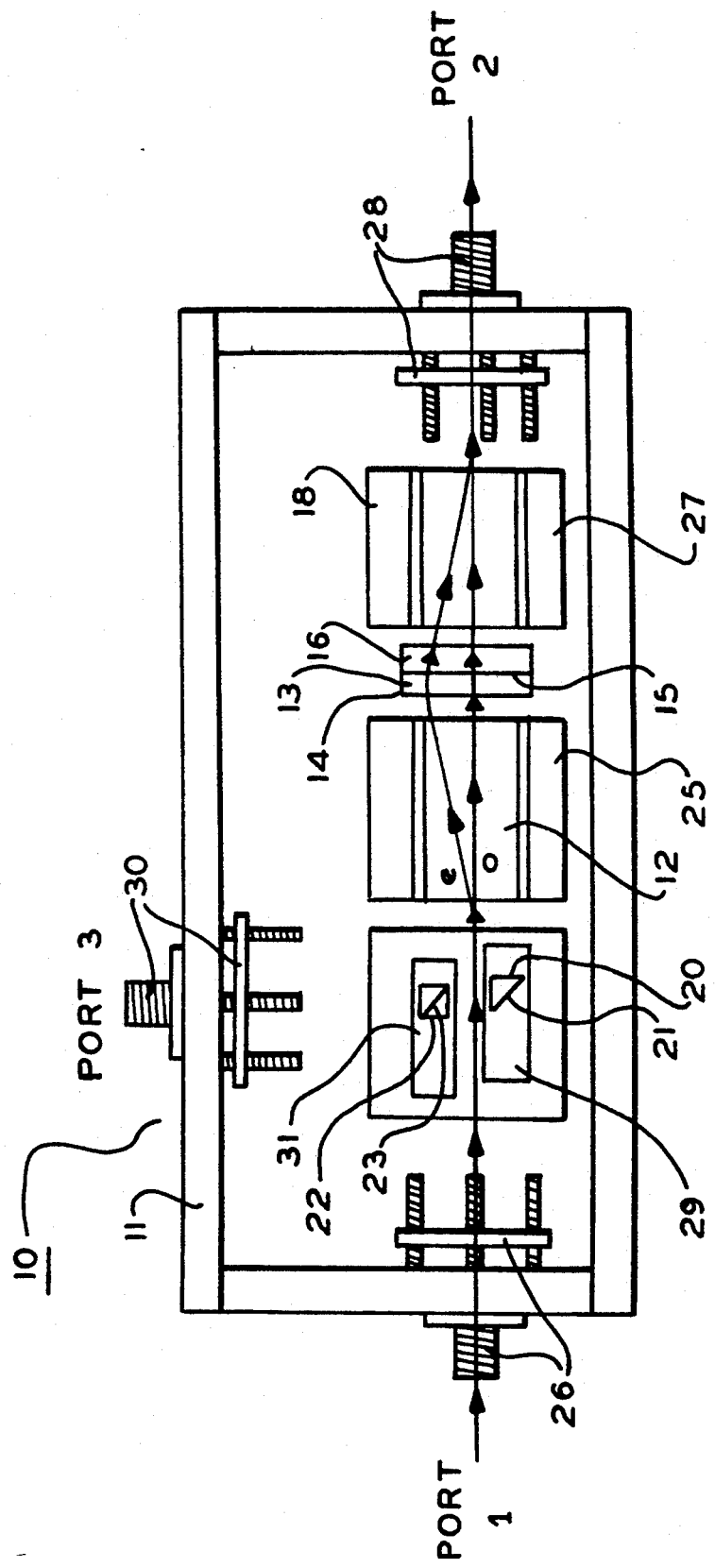

United States Patent [19]
Van Delden

[11] Patent Number: 5,212,586
[45] Date of Patent: May 18, 1993

[54] OPTICAL CIRCULATOR HAVING A SIMPLIFIED CONSTRUCTION

[75] Inventor: Jay S. Van Delden, Montville, N.J.
[73] Assignee: Optics for Research, Caldwell, N.J.
[21] Appl. No.: 798,633
[22] Filed: Nov. 26, 1991
[51] Int. Cl.$^5$ ............................ G02B 5/30; G02F 1/09
[52] U.S. Cl. .................................... 359/281; 359/484; 359/496
[58] Field of Search ............... 359/280, 281, 282, 283, 359/284, 484, 496; 385/6, 11

[56] References Cited

U.S. PATENT DOCUMENTS

| | | | |
|---|---|---|---|
| 3,267,804 | 8/1966 | Dillon, Jr. ............................ | 359/484 |
| 4,272,159 | 6/1981 | Matsumoto ........................... | 359/484 |
| 4,464,022 | 8/1984 | Emkey ................................. | 359/484 |
| 4,650,289 | 3/1987 | Kuwahara ........................... | 359/484 |
| 4,988,170 | 1/1991 | Buhrer ................................. | 359/499 |
| 4,991,938 | 2/1991 | Buhrer et al. ....................... | 359/499 |

FOREIGN PATENT DOCUMENTS 422687  4/1991  European Pat. Off. ............ 359/484

OTHER PUBLICATIONS

Shirasaki et al., "Compact Polarization-Independent Optical Circulator," *Applied Optics*, vol. 20, No. 15, Aug. 1, 1981, pp. 2683 to 2687.

*Primary Examiner*—Martin Lerner
*Attorney, Agent, or Firm*—John N. Bain; Raymond J. Lillie

[57] ABSTRACT

An optical circulator which includes a first birefringent plate for receiving an incident beam of light from a first port, a Faraday rotator, a polarization transforming device, and a second birefringent plate immediately adjacent a second port and the polarization transforming device. The optical circulator further includes means for diverting light traveling from the second port to a direction of travel which is at a right angle to the prior direction of travel, whereby the light is directed to a third port. The diverting means is immediately adjacent the first birefringent plate and the first port, and permits the clear passage of light from the first port to the first birefringent plate. The optical circulator has a simplified design while providing for the efficient transmission of polarized light.

7 Claims, 2 Drawing Sheets

OPTICAL CIRCULATOR HAVING A SIMPLIFIED CONSTRUCTION

This invention relates to optical circulators. More particularly, this invention relates to optical circulators having a more simplified construction while retaining the ability to transmit light without significant losses.

Optical circulators have a wide variety of applications, such as, for example, bidirectional communications employing optical fibers, use with optical time domain reflectometers (OTDR's) which sense imperfections in optical fibers, fiber amplifiers, and fiber sensors. A representative example of an optical circulator is disclosed in U.S. Pat. No. 4,464,022, issued to Emkey. This patent discloses an optical circulator having at least three ports which comprises a first birefringent plate disposed at a first port in order to separate an incident light beam at that port into two beams having orthoganal directions of polarization, and a second birefringent plate disposed at a second port, which recombines the two beams. The optical circulator also includes means disposed between the first and second birefringent plates for nonreciprocal rotation of the directions of polarization of the beams. A third birefringent plate is disposed between the rotation means and the second birefringent plate for further separation of the two beams. A reflecting element (e.g., a right angle prism) is disposed between the third plate and the second plate for deflecting the two beams toward the second port. The reflecting element has a slot which permits passage therethrough of an incident beam from a third port.

Although the Emkey optical circulator provides for the transmittal of light without significant loss, the Emkey optical circulator includes three birefringent plates. Such plates must have a proper alignment and thickness in order for the proper transmission of light to occur.

It is therefore an object of the present invention to provide an optical circulator having a simplified construction while providing for the efficient transmission of light.

In accordance with an aspect of the present invention, there is provided an optical circulator which comprises a first birefringent plate (also known as a birefringent walk off plate) disposed at a first port for separating an incident beam of light from the first port into two beams having orthogonal directions of polarization. The first birefringent plate also can receive light traveling in a reciprocal direction from a second port. The optical circulator also includes a Faraday rotator. The Faraday rotator includes an optical element which has an optical axis and a means (such as a permanent magnet or an electromagnet) for generating a magnetic field along the optical axis of the optical element. The circulator also comprises a polarization transforming component, and a second birefringent plate located between the polarization transforming component and the second port. The second birefringent plate is immediately adjacent to both the second port and the polarization transforming component. The second birefringent plate is capable of combining into one beam of light, the two beams of light traveling from the first birefringent plate and having orthogonal directions of polarization. The one beam of light then travels to the second port. The second birefringent plate also is capable of separating an incident beam of light from the second port into two beams having orthogonal polarization. The incident beam of light from the second port travels in a direction reciprocal to that of the light traveling from the first port. The optical circulator further includes means for diverting light traveling from the second port through the first birefringent plate along a direction of travel at a right angle to the prior direction of travel of the light traveling from the second port through the first birefringent plate, whereby the diverting means directs to a third port the light traveling from the second port through the first birefringent plate, and the directing means is immediately adjacent to the first birefringent plate, wherein the diverting means allows the clear passage of light from the first port to the first birefringent plate.

The term "port" as used herein means any medium which transmits, transports, or receives light, such as, for example, laser transmitters, optical fibers and cables, and receivers, such as bidirectional communications receivers. It is to be understood, however, that the scope of the present invention is not to be limited to any specific "port".

In a preferred embodiment, the diverting means includes (a) a right angle prism and (b) a polarizing beam splitter cube. The right angle prism directs a first beam of linearly polarized light, traveling from the second port through the first birefringent plate, to a direction of travel at a right angle to the prior direction of travel. The beam splitter cube directs a second beam of linearly polarized light, traveling from the second port through the first birefringent plate, to a direction of travel at a right angle to the prior direction of travel. The right angle prism and the beam splitter cube also combine the first beam and the second beam of linearly polarized light to form a combined beam, and direct the combined beam to the third port.

The first and second birefringent plates may be made of any of a variety of materials known in the art, such as, for example, calcite or rutile. Preferably, the thicknesses of the first and second birefringent plates are essentially equal.

The Faraday rotator includes an optical element having an optical axis and a means for generating a magnetic field along the optical axis of the optical element. The generation of a magnetic field along the optical axis of the optical element causes the rotation of the plane of polarization of polarized light passing through the optical element by a desired angle of rotation $\theta$. Preferably, $\theta$ is 45°. The rotation may be in a clockwise or counterclockwise direction. The means for generating a magnetic field along the optical axis of the optical element may be a permanent magnet having an annulus (sometimes known as a "donut magnet"), or an electromagnet. The optical element may be formed from a variety of materials, such as, but not limited to, yttrium-iron-garnet (YIG), and bismuth-iron-garnet (BIG). Bismuth-iron-garnet optical elements are in general formed from bismuth-, iron-, and oxygen-containing films grown upon a gadolinium-gallium-garnet (GGG), or large lattice constant (LLC) substrate. The substrate may be removed after the films are grown to a sufficient thickness. Examples of bismuth-iron-garnet films include, but are not limited to those having the following formulae:

$(Tm_{2.14} Bi_{0.80} Pb_{0.07}) (Fe_{3.13} O_{12}$;

$(Bi_{1.09} Tm_{0.07} Gd_{0.95} Y_{0.09}) (Fe_{3.91} Ga_{0.76} Y_{0.030} Tm_{0.02})O_{12}$;

$(HoTbBi)_3 Fe_5 O_{12}$;

$(YbTbBi)_3 Fe_5 O_{12}$;

$Y_3Fe_5O_{12}$;
$(TbBi)_3 (FeGa)_5 O_{12}$;
$(GdBi)_3 (FeAlGa)_5 O_{12}$;
$(BiLuGd)_3Fe_5O_{12}$; and
films formed from compositions having the formula:
$Bi_xRE_{3-x}Fe_{5-y} Ga_y O_{12}$, wherein RE is a rare earth element, x is between 0.4 and 0.6, and y is between 0.8 and 1.2. Examples of bismuth-iron-garnet films are further described in U.S. patent application Ser. No. 611,774, filed Nov. 13, 1990 now U.S. Pat. No. 5,111,330.

Such materials permit the rotation of the plane of polarization of polarized light of various wavelengths. The light, for example, may have a wavelength ranging from about 780 nm to about 1550 nm.

The polarization transforming component has a rotation in a direction which may be clockwise or counterclockwise. The direction of the rotation by the polarization transforming component may be the same as or opposite to that caused by the Faraday rotator. Preferably, the angle of rotation is 45°. The polarization transforming component may, in one embodiment, be a half-wave retarder, such as a crystal quartz retarder. It is contemplated, however, that within the scope of the present invention, the polarization transforming component also may be, for example, a 45-degree optically active rotator or a liquid crystal rotator or retarder.

Figure 2:
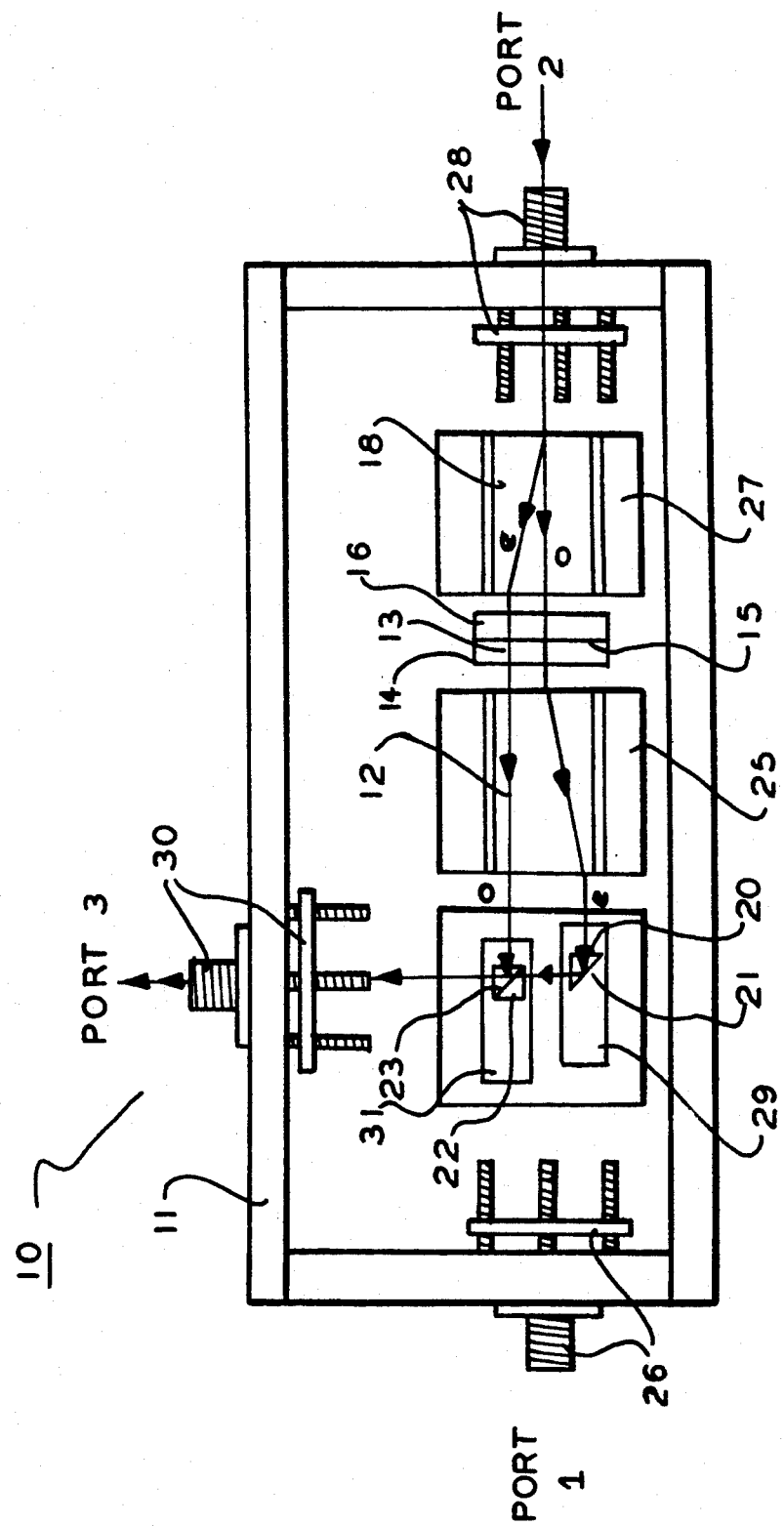

The invention will now be described with respect to the drawings, wherein:

FIG. 1 is schematic of an embodiment of an optical circulator in accordance with the present invention in which light travels from the first port (Port 1) to the second port (Port 2); and FIG. 2 is a schematic of the optical circulator in which light travels from the second port (Port 2) to the third port (Port 3).

Referring now to the drawings, a beam of light from Port 1, as shown in FIG. 1, is guided into the optical circulator 10, contained within a housing 11, through a tilt plate assembly 26, and enters a first birefringent walk-off plate 12, contained within housing 25, in which the beam of light is split into an ordinary ray (o-ray) and an extraordinary ray (e-ray). The o-ray and the e-ray are orthogonally polarized and are two distinct rays of different paths. Before entering first birefringent plate 12, the beam of light optionally may pass through an internal lens collimating assembly (not shown). Port 1 may be any light source, such as, for example, a laser transmitter. The separation or translation of the e-ray with respect to the o-ray is a function of the length of the birefringent walk-off plate, the refractive indices of the plate, and the specific crystal axis orientation used.

After exiting the first birefringent plate 12, the two rays or beams of light enter a non-reciprocal Faraday rotator 14. Faraday rotator 14 includes an optical element 15 surrounded by a permanent magnet 13. The beams enter optical element 15, which may be formed from an epitaxially grown bismuth-substituted-iron-garnet ferromagnetic material. Such an optical element has a path length of about 350 μm for light having a wavelength of 1300 nm, and a path length of about 450 μm for light having a wavelength of about 1550 nm.

Magnet 13 generates a magnetic field along the optical axis of optical element 15, whereby the plane of polarization of both beams is rotated by an angle of rotation 0 of 45°. The beams of light then exit the optical element 15 of Faraday rotator 14 and enter a crystal quartz half-wave retarder 16, which is a polarization transforming component. The half-wave retarder 16 rotates the plane of polarization of polarized beams of light by 45°. If the rotation of the plane of polarization of the polarized beams of light is clockwise or counterclockwise by both the Faraday rotator 14 and the half-wave retarder 16 by 45°, then the total rotation is 90°. If the rotation of the plane of polarization of the polarized beams of light is 45° clockwise by the Faraday rotator 14 and 45° counterclockwise by the half-wave retarder 16, or the rotation of the plane of polarization of the beams of polarized light is 45° counterclockwise by Faraday rotator 14, and 45° clockwise by half-wave retarder 16, then there is zero net rotation.

Upon exiting the half-wave retarder 16, the polarized beams of light enter the second birefringent walk-off plate 18, contained within housing 27. Second birefringent plate 18 is identical to the first birefringent plate 12 except that the axis orientation, with respect to the two incoming beams, of second birefringent plate 18 is transposed with respect to the first birefringent plate 12. The net result is that the two beams or rays are combined into one beam at the output end of second birefringent plate 18. The single beam of light exits second birefringent plate 18, is guided through tilt plate assembly 28, and enters Port 2, whereby the beam of light enters an intended use. For example, "Port 2" may be an optical fiber along which the light is transported as part of a communications system.

As shown in FIG. 2, a beam of light traveling from Port 2 enters the second birefringent walk-off plate 18, in which the beam of light is separated into two beams (the ordinary ray and extraordinary ray) which are orthogonally polarized. As a result of such separation the ordinary ray remains colinear with the input beam, and the extraordinary ray will be separated, or "walk-off" from the ordinary ray by a distance that is a function of the thickness of the second birefringent plate 18, the refractive indices of the second birefringent plate 18, and the specific crystal axis orientation used, which normally would be such that the "walk-off" is maximized. Upon exiting the second birefringent plate 18, the two beams of light enter the half-wave retarder 16, which rotates the plane of polarization of both beams of light by 45°. The rotation may be clockwise or counterclockwise. The two beams of light then exit the half-wave retarder 16 and enter the optical element 15 of Faraday rotator 14. The rotation of the plane of polarization of polarized light is in a direction (clockwise or counterclockwise) which is the same whether the light is incident from Port 1 or Port 2. If the rotation of the plane of polarization of polarized light, traveling in a direction from Port 2 to Port 1, by the half-wave retarder 16 and by the Faraday rotator 14 is 45° in the clockwise direction, then the net rotation is 90° in the clockwise direction. If the rotation of the plane of polarization of polarized light, traveling in a direction from Port 2 to Port 1, by the half-wave retarder 16 and the Faraday rotator 14 is 45° in the counterclockwise direction, then the net rotation of the plane of polarization of the beams of light is 90° in the counterlockwise direction. If the half-wave retarder 16 and the Faraday rotator 14 rotator rotate the plane of polarized light by 45° in opposite directions, then the net rotation is zero. In the embodiment shown, the beams of light traveling from Port 2 to Port 1 are rotated 45° in a clockwise direction by the half-wave retarder 16 and the Faraday rotator 14, thus making the total rotation 90°. The two beams of light, after rotation of the planes of polarization in Faraday rotator 14, enter the first birefringent plate 12. As the beams enter first birefringent plate 12, the ray which is located directly on the optical axis, is perceived as an extraordinary ray by the first birefringent plate 12. Thus, this ray or beam will be translated, or separated from the optical axis. The other ray, being perceived as an ordinary ray by the first birefringent plate 12, continues to travel through the first birefringent plate untranslated. The net result is that the two beams exit the first birefringent plate 12 equally translated away from the optical axis, and each beam is linearly polarized orthogonally to each other.

Upon exiting the first birefringent plate 12, the extraordinary ray enters a right angle prism 20, contained within housing 29, and having a hypotenuse face 21, which is at a 45° incidence to the extraordinary ray. The extraordinary ray will be totally internally reflected off the hypotenuse face 21 so as to be bent through an angle of 90° with respect to the incoming extraordinary ray. The ordinary ray enters a polarizing beam splitter cube 22, contained within housing 31, and having an internal hypotenuse plane 23. Upon entering the beam splitter cube 22, and contacting the internal hypotenuse plane 23, the ordinary ray is reflected by 90 degrees. The ordinary ray is reflected through the beam splitter cube 22 with little loss. The extraordinary ray, after being reflected by right angle prism 20, also passes through beam splitter cube 22 with little loss. As the two beams pass through the beam splitter cube 22, they are recombined and a single output beam of light is guided by tilt plate assembly 30, as it travels to Port 3, which, for example, may be a receiver in an optical communications system.

The optical circulator of the present invention has a variety of applications, as hereinabove stated, and may be employed in connection with other optical circulators as part of a communications or optics network. For example, the optical circulators may be employed as part of a bidirectional communications system. Light may be transmitted from Port 1, which is a transmitter at a first end of a bidirectional communications system into an optical circulator such that the light travels from Port 1 to Port 2, which is an optical fiber. The light travels through the optical fiber (Port 2) until it reaches another optical circulator which is oriented such that the light travels from Port 2 to Port 3, wherein Port 3 is the receiver at a second end of the bidirectional communications system. A transmitter at the second end may transmit light back to the first end of the system by transmitting light through an optical circulator having an orientation such that the light travels from Port 1 to Port 2 (an optical fiber). The light travels through the optical fiber until it reaches another optical circulator at the first end having a configuration such that the light travels from Port 2 to Port 3 (a receiver). Thus, the optical circulators are useful in transmitting light in a bidirectional communications system simultaneously having transmitters and receivers at opposite ends without conventional multiplexing and demultiplexing techniques.

Advantages of the present invention include the ability to provide an optical circulator with only two birefringent "walk-off" plates instead of three birefringent plates. Thus, the optical circulator of the present invention provides for efficient transmittal of light of various wavelengths while providing for a more simplified optical circulator design.

It is to be understood, however, that the scope of the present invention is not to be limited to the specific embodiments described above. The invention may be practiced other than as particularly described and still be within the scope of the accompanying claims.

What is claimed is:

1. An optical circulator comprising:
   a first birefringent plate disposed at a first port for separating an incident beam of light from said first port into two beams having orthogonal directions of polarization and to receive light traveling in a reciprocal direction from a second port;
   a Faraday rotator which includes an optical element having an optical axis and a means for generating a magnetic field along the optical axis;
   a polarization transforming component;
   a second birefringent plate located between said polarization transforming component and the second port, said second birefringent plate being immediately adjacent to both said second port and said polarization transforming component, said second birefringent plate being capable of combining into one beam of light said two beams of light traveling from said first birefringent plate and having orthogonal directions of polarization, said one beam of light traveling to said second port, and said second birefringent plate being capable of separating an incident beam of light from said second port into two beams of orthogonal polarization, said incident beam of light from second port traveling in a direction reciprocal to that of light traveling from said first port; and
   a means for diverting light traveling from said second port through said first birefringent plate along a direction of travel at a right angle to the prior direction of travel of said light traveling from said second port through said first birefringent plate, whereby said diverting means directs to a third port said light traveling from said second port through said first birefringent plate and said diverting means being immediately adjacent to said first birefringent plate, wherein said diverting means allows the clear passage of light from said first port to said first birefringent plate, said diverting means including (a) a right angle prism and (b) a beam splitter cube, wherein said right angle prism directs a first beam of linearly polarized light traveling from said second port through said first birefringent plate, to a direction of travel at a right angle to the prior direction of travel, and wherein said beam splitter cube directs a second beam of linearly polarized light traveling from second port through said first birefringent plate, to a direction of travel at a right angle to the prior direction of travel, whereby said right angle prism and said beam splitter cube combine said first beam and said second beam of linearly polarized light to form a combined beam, and direct said combined beam to said third port.

2. The optical circulator of claim 1 wherein the thicknesses of said first birefringent plate and of said second birefringent plate are essentially equal.

3. The optical circulator of claim 1 wherein said optical element is formed from a yttrium-iron-garnet material.

4. The optical circulator of claim 1 wherein said optical element is formed from a bismuth-iron-garnet material.

5. The optical circulator of claim 1 wherein said polarization transforming component is a half-wave retarder.

6. The optical circulator of claim 1 wherein said polarization transforming component is a 45-degree optically active rotator.

7. The optical circulator of claim 1 wherein said polarization transforming component is a liquid crystal rotator or retarder.

* * * * *